United States Patent [19]

Rapoport et al.

[11] Patent Number: 5,331,652
[45] Date of Patent: Jul. 19, 1994

[54] SOLID STATE LASER HAVING CLOSED CYCLE GAS COOLED CONSTRUCTION

[75] Inventors: William R. Rapoport, Bridgewater; Kenrick R. Leslie, Morris Plains; Theodore T. Hadeler, Montvale; LaValle V. Brummert, Middletown, all of N.J.

[73] Assignee: AlliedSignal Inc., Morris Township, Morris County, N.J.

[21] Appl. No.: 34,993

[22] Filed: Mar. 22, 1993

[51] Int. Cl.⁵ .................................. H01S 3/04
[52] U.S. Cl. .............................. 372/34; 372/35
[58] Field of Search ........................... 372/34, 35

[56] References Cited

U.S. PATENT DOCUMENTS

| | | | |
|---|---|---|---|
| 3,997,853 | 12/1976 | Morris et al. | 372/34 |
| 4,272,733 | 6/1981 | Walling et al. | 372/34 |
| 4,734,913 | 3/1988 | Morris et al. | 372/34 |
| 4,835,786 | 5/1989 | Morris et al. | 372/72 |
| 4,858,242 | 8/1989 | Kuper et al. | 372/72 |
| 5,181,215 | 1/1993 | Sam et al. | 372/34 |

FOREIGN PATENT DOCUMENTS

| | | | |
|---|---|---|---|
| 2134075 | 7/1970 | Fed. Rep. of Germany . | |
| 0043587 | 3/1983 | Japan | 372/34 |
| 0136385 | 7/1985 | Japan | 372/35 |
| 0298193 | 12/1987 | Japan | 372/35 |

*Primary Examiner*—Georgia Y. Epps
*Attorney, Agent, or Firm*—Verne E. Kreger, Jr.; Ernest D. Buff

[57] ABSTRACT

A solid state laser comprises a housing having a body portion for enclosing optical components thereof. A mounting means is provided for mounting the optical components directly to the housing. The housing has stiffness sufficient for spatial and angular positioning of the optical components. A cooling means transfers heat from the optical components to the housing by circulation of a preselected gas therewithin.

17 Claims, 2 Drawing Sheets

SOLID STATE LASER HAVING CLOSED CYCLE GAS COOLED CONSTRUCTION

BACKGROUND OF THE INVENTION

1. Field Of The Invention

The present invention relates to laser systems for medical, machining and military applications; and more particularly to solid state lasers which are compact, reliable for long term use and easily replaced in the field.

2. Description Of The Prior Art

Solid state lasers are those in which the gain medium is a solid material usually having the form of an elongated cylindrical rod. Typically, the rod is composed of crystalline material, a glass or a plastic doped with an active ion such as $Nd^{3+}$ or $Cr^{3+}$, which provides lasing action in a laser resonator defined by a pair of mirrors. In such lasers, the solid state laser rod reaches an active state ready to provide laser gain upon exposure to the light from a flashlamp.

Solid state lasers of the type described are subject to several problems. One of the problems is the difficulty of maintaining accurate alignment of the optics and components of the laser resonator. Oftentimes, lasers that have worked in a mechanically and thermally stable laboratory fail to operate properly when brought to a machine shop floor or a doctor's office, wherein physical jarring or even temperature changes cause the optics to go out of alignment. Another problem with solid state lasers is the relatively high cost thereof. Contributing to the high cost of solid state lasers are (1) the need for a heavy frame to keep the optics aligned, (2) a separate housing which protects against some dust, but is not usually air tight, and (3) an expensive heat exchanger/heat removal system. Heat is usually removed from the laser by water which circulates around the flashlamp and around the solid state laser rod. This water must be kept clean using filters which add to the expense of the system. A further problem presented by the use of water around the laser rod is the lengthy time required to heat the water to operating conditions. Alternative arrangements for removing heat from the laser rod operate by putting the rod in thermal contact with a solid material. These alternative arrangements also require a large mass to be heated to operating temperature and, consequently, cause the heat removal to be nonuniform, thereby creating optical distortions in the laser rod.

SUMMARY OF THE INVENTION

The present invention provides a laser which is lightweight, small, inexpensive to construct and highly reliable in operation. Generally stated, the laser comprises a housing having a body portion for enclosing optical components of the laser. A mounting means is provided for mounting the optical components directly to the housing. The housing has stiffness sufficient for spatial and angular positioning of the optical components. A cooling means transfers heat from the optical components to the housing by circulation of a preselected gas therewithin.

Use of a housing that encloses the optical components of the laser and has sufficient stiffness for spatial and angular positioning of optical components mounted directly thereto markedly increases the reliability of the laser system. The number of components of the laser, and hence the size and weight thereof, are significantly reduced. Heat generated by the laser rod, flashlamp and other components of the system is transferred to the housing in an efficient, uniform manner, so that optical distortions in the laser rod are avoided. The circulating gas keeps temperature gradients in the housing small and minimizes alignment changes. The optical components within the housing are readily sealed against outside contamination in a preselected gas. Heat removal efficiency can be further increased by heat exchange means in contact with said housing and said preselected gas. The laser rod is heated by heating means disposed adjacent thereto. Power and time required for warm up of the laser are reduced, and rapid firing (i.e. minimal warm up time preceding initial lasing) is achieved.

BRIEF DESCRIPTION OF THE DRAWINGS

The invention will be more fully understood and further advantages will become apparent when reference is made to the following detailed description and the accompanying drawings, in which.

DETAILED DESCRIPTION OF THE INVENTION

Figure 1:
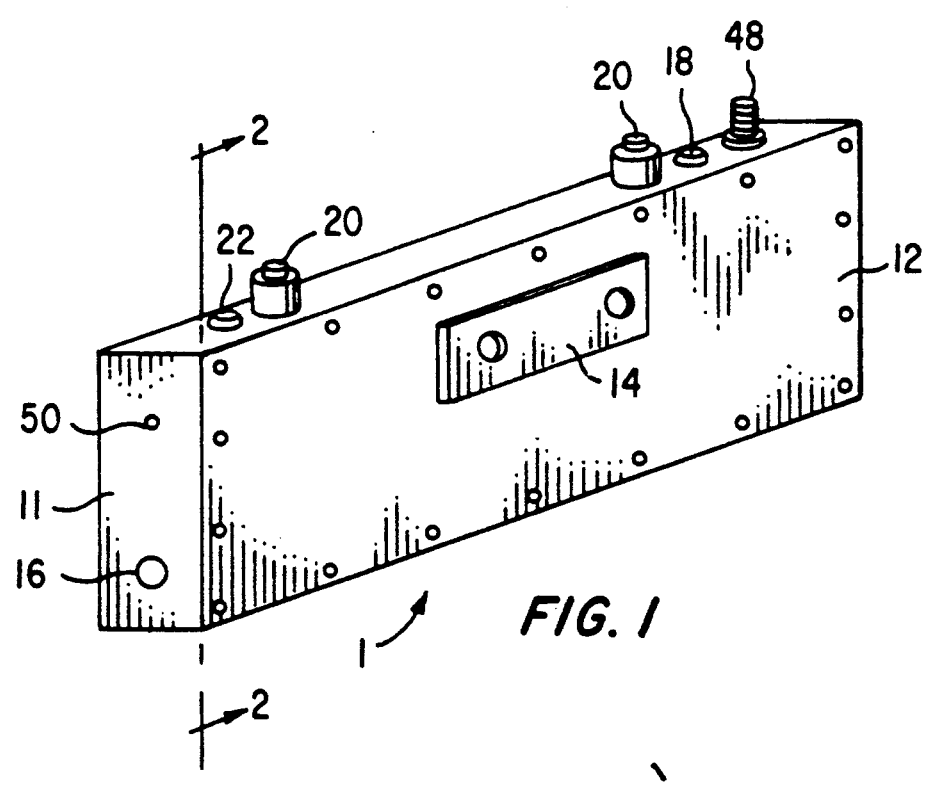
FIG. 1 is a perspective view of a laser incorporating the elements of the present invention.
Figure 2:
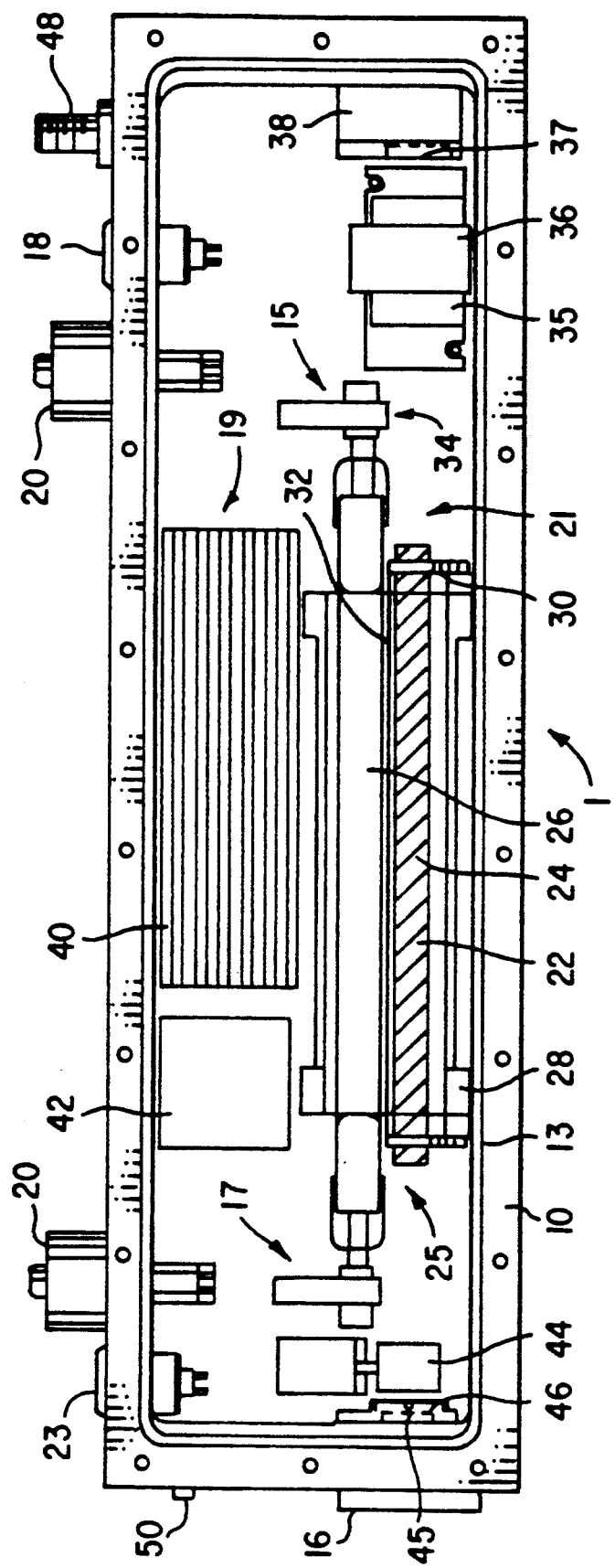
FIG. 2 is a side sectional view taken along the plane 2—2 of FIG. 1.

Referring to FIGS. 1 and 2 of the drawings, there is shown generally at 1 a laser system incorporating the laser resonator of this invention. The laser 1 comprises a housing 10 having a body portion for enclosing optical components, shown generally at 15 and specifically at 22, 35, 37 and 45, of the laser. A mounting means, shown generally at 17 and specifically at 30, 34, 38 and 46, is provided for mounting the optical components 15 directly to the housing 10. The housing 10 has stiffness sufficient for spatial and angular positioning of the optical components 15. A cooling means, shown generally at 19 transfers heat from the optical components 15 to the housing 10 by circulation of a preselected gas therewithin. In addition, heat is transferred by the cooling means 19 to housing 10 from other internal components of the laser 1. Optical components from which heat is transferred by cooling means 19 to housing 10 comprise solid state laser rod 22, Q-switch 35, high reflector 37 and output coupler 45. Other components from which heat is transferred to housing 10 by cooling means 19 comprise heater wire 24, reflector 28, rod holders 30, solarization plate 32, lamp holders 34, fan 42, high reflector assembly 38, output coupler assembly 46 and shutter 44.

More specifically, as shown in FIGS. 1 and 2, housing 10 comprises a box 11 and a side plate 12, which collectively comprise the body portion of the laser 1. Electrical feed throughs are used for the shutter control 23, the flashlamp power 20 and the Q-switch control 18 and heater current 23. The output beam passes through a window 16. The external water heat exchanger 14 is mounted on the side cover 12 of the housing 10. A second water heat exchanger, not shown, is mounted on the opposite side of the housing 10.

Referring to FIG. 2, there are shown the internal components of the laser 1. A sealing means 13 associated with housing 10 seals optics therewithin from contaminants outside the housing 10. The optical components comprise a solid state laser rod 22 for producing gain within the laser 1. A plurality of rod holders 30 composed of thermally insulating material minimize heat transfer from rod 22 to housing 10 during warm up of the laser prior to initial lasing thereof.

The laser 1 can also comprise heating means 24 disposed adjacent rod 22 for heating rod 22 to reduce time and power required for warm up of the laser. As shown, rod 22 is heated by a length of wire 24 wrapped around the rod diameter several times. The rod temperature is controlled by monitoring the resistance of the wire and pulsing current to the wire when required. The wire heater method allows the first laser pulse to be full energy after only approximately 2 minutes of warm-up time.

The optical components mounted to housing 10 can further comprise a reflector 28 and a lamp, such as flashlamp 26. Reflector 28 has a vacuum deposited silver coating that is protected by a silicon dioxide layer. The ends of the reflector are open and symmetric to remove heat uniformly. Flashlamp 26 is made of quartz with Xe gas fill. It is cooled by forced air, as described hereinafter, so that long lifetime results.

The mounting means 17 is constructed to minimize interference with circulation of the preselected gas. Circulation means 42 moves the preselected gas in a direction parallel to the laser rod. The rod holders 30 are constructed to present minimal cross sectional area in the direction of movement of the gas.

Specifically, the rod holder 30 serves several purposes. Its design minimizes the cross section of the holder in the air stream. The rod holder 30 is composed of poor thermally conducting material such as stainless steel and has a thin profile to reduce heat flow. The rod holder 30 captures a zirconia ring (not shown) which holds the rod. This construction significantly reduces the heat flow. The rod holder 30 also compresses an o-ring which prevents the rod 30 from rotating, holds the solarization plate 32 and acts as a feed through for the wire heater 24.

The mounting means can further comprise a plurality of lamp holders 34. Each of the lamp holders 34 has minimum cross sectional area in the direction of movement of the gas, so that the reduction in air flow in the reflector resulting from their presence is minimized.

A Q-switch 35 in Q-switch housing 36 is driven by an electric field and has a sol-gel coating to reduce reflections. This type of coating can only be used in a purged and sealed housing such as this since the coatings are humidity sensitive.

A high reflector assembly 38 aligns the high reflector mirror 37 of the laser resonator, shown generally at 21, and uses a spring steel flex mount. The optic is bonded into position to reduce stress birefringence that would interfere with orienting the laser rod.

Cooling means 19 can comprise heat exchange means 40 disposed adjacent to and within the housing 10 for transferring heat from the preselected gas to the housing 10. Specifically, heat exchanger 40 conducts heat from the high velocity air stream and transmits it to the housing 10 where it is removed by air or water heat exchanger 14. This location reduces the temperature of the fan, which is the most thermally sensitive component. The heat exchange means 40 comprises a plurality of metal plates arranged to provide a large surface area appointed for contact with the preselected gas to promote exchange of heat from the gas to the housing 10. Preferably, the fan 42 of which the cooling means 19 is comprised is a high RPM unit which moves air very quickly through the housing 10. The fan 42 produces little outgassing which would contaminate the optics at the elevated temperatures in the box during operation. Air flow proceeds from the fan 42, past reflector 28 to the heat exchanger 40. The fan 42 is turned on and off by sampling the duty cycle of the flashlamp and temperature in the box. The fan is off during the warm up period and is on continuously when the unit is operating at 100% duty cycle.

Instead of or in addition to fan 42, the laser 1 can have, as secondary cooling means, a water jacket 14 thermally associated with the housing 10. Shutter 44 is a solenoid that rotates a balanced 2 plate beam block to prohibit lasing intracavity. An output coupler 46 is bonded to a metal carrier using a low outgassing elastic bonding compound. The carrier is bolted to the housing 10. To minimize wavelength wander, the output coupler can be provided with a narrow band reflective coating.

Housing 10, shown in FIG. 1 as a box enclosure, is as small as possible to keep the air flow velocity high. Since the laser resonator is part of the housing 10, all the materials are produced from the same metal alloy to keep thermal expansions equal. The small size of the housing 10 makes it stiff enough to hold the alignment. The optical components are located in the lower section away from the heat exchanger 40 to minimize laser resonator mis-alignment due to the bending mode of the housing 10 caused by temperature gradients. Misalignment of the laser resonator 21 due to temperature differences of the two ends of the housing 10 are minimized by locating the heat exchanger 40 near the center (end to end) of the housing 10. The high velocity fan 42 keeps temperature gradients in the housing small and minimizes alignment changes. The housing 10 is dry nitrogen purged through the Schrader valve 48 and relief valve 50, producing a dry environment and having the benefit of high electrical arc resistance for the flashlamp ignition pulse.

In embodiments of laser resonator 21 wherein the laser rod 22 is composed of alexandrite, the optical components can further comprise an optical plate 32 mounted to the housing 10 and disposed therewithin between the lamp 26 and the laser rod 22. Optical plate 32 is operative to prevent transmission of light having wavelengths below 350 nm, thereby preventing solarization of the alexandrite. In the embodiment shown, the solarization plate 32 is anti-reflection coated for low transmission loss. The plate is only 0.020 inch thick to minimize blockage of gas flow.

The laser 1 which has been disclosed herein can, of course, be modified in various ways without departing from the scope of the invention. As shown herein, the housing 10 encloses the principal components of the laser and operates as a heat sink to receive heat transferred thereto by the cooling means 19. Those principal components comprise laser resonator 21, an excitation system 25 and a thermal management system 19. As described herein, laser resonator 21 comprises a plurality of components, including laser rod 22, Q-switch 35, high reflector, reflector 28, mirrors 37 and output coupler 45. Components of which the excitation system 25 is comprised include heater wire 24, flashlamp 26, reflector 28 and solarization plate 32. The thermal management system 19 has, as components thereof, housing 10, water heat exchanger 14, reflector 28, heat exchanger 40 and fan 42. (The reflector 28 is a component of the excitation system 25, as it collects light from the flashlamp 26 and directs it to the laser rod 22. In addition, reflector 28 serves as a component of the thermal management system, as it directs the gas flow around the flashlamp 26 and laser rod 22.) Other embodiments of laser 1 wherein the components of the laser resonator 21, excitation system 25 and thermal management system 19 are varied or the arrangement of which within housing 10 is modified are within the spirit of this invention. For example, the housing 10 could have a cylindrical configuration. The gas flow within housing 10 could be coaxial. A double chamber configuration of housing 10 could be provided to permit use of a larger fan and increased flow of gas therein. The laser resonator 21 could be extended to provide for location therein of further intracavity elements. Flashlamp 26 could be replaced by diodes or a diode laser. The high reflector mirror 37 and high reflector mirror assembly 38 can be replaced by prisms or by a mirror and prisms. Such modifications are intended to fall within the scope of the invention as defined by the subjoined claims.

In operation, voltage is applied to wire heater 24 to heat the laser rod 22 (if needed). After a short preselected time interval, a current pulse is passed through the lamp 26, creating a light pulse which is absorbed by the rod 22. The voltage to the Q-switch 36 is changed to allow lasing to occur at the time at which the laser rod 22 is appropriately excited. Lasing builds up in the laser resonator, between the high reflector 37 in the high reflector assembly 38 and the output coupler 45 in the output coupler assembly 46. After several laser pulses, or as required, the fan 42 is powered on to circulate the gas in the housing 10 to take heat from the lamp 26, rod 22 and reflector 28, as well as from other components wherein heat is produced, to the heat exchanger 40. The heat exchanger 40 transfers the heat to the housing 10 where it is removed by external water heat exchanger 14.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. In a laser system, a laser resonator, comprising:
   (a) a housing having a body portion for enclosing optical components of the laser,
   (b) mounting means for mounting optical components of said laser directly to said housing;
   (c) said housing having stiffness sufficient for spatial and angular positioning of said optical elements; and
   (d) cooling means for transferring heat from said optical components to said housing by forced circulation of a preselected gas therewithin.

2. A laser, as recited by claim 1, further comprising sealing means associated with said housing for sealing optics therewithin from contaminates outside said housing.

3. A laser, as recited by claim 1, wherein said optical components comprise a laser rod for producing gain within said resonator and said mounting means comprise a plurality of rod holders composed of thermally insulating material for minimizing transfer of heat from said rod to said housing during warm up of said laser prior to initial lasing thereof.

4. A laser, as recited by claim 3, further comprising heating means disposed adjacent said rod for heating said rod to reduce time and power required for warm up of said laser.

5. A laser, as recited by claim 4, wherein said heating means comprises a resistance wire spirally wrapped around said rod.

6. A laser, as recited by claim 1, wherein said mounting means is constructed to minimize interference with circulation of said preselected gas.

7. A laser, as recited by claim 3, wherein said cooling means moves said preselected gas in a direction parallel to said laser rod and said rod holders have minimal cross sectional area in the direction of movement of said gas.

8. A laser, as recited by claim 3, wherein said optical components further comprise a reflector and a lamp, and said mounting means further comprise a plurality of lamp holders, and each of said reflector and said lamp holders have minimal cross sectional area in the direction of movement of said gas.

9. A laser, as recited by claim 1, further comprising secondary cooling means for removing heat from said housing.

10. A laser, as recited by claim 9, wherein said secondary cooling means comprises a water jacket thermally associated with said housing.

11. A laser, as recited by claim 9, wherein said secondary cooling means comprises means for moving gas adjacent said housing.

12. A laser, as recited by claim 1, wherein said laser rod is composed of a lasing material that utilizes chromium as its active ion.

13. A laser, as recited by claim 3, wherein said laser rod is composed of alexandrite.

14. A laser, as recited by claim 13, wherein said optical components further comprise an optical plate mounted to said housing and disposed therewithin between said lamp and said laser rod, said optical plate being operative to prevent transmission of light having wavelengths below 350 nm for preventing solarization of said alexandrite.

15. A laser, as recited by claim 1, wherein said cooling means further comprises heat exchange means disposed adjacent to and within said housing for transferring heat from said preselected gas to said housing.

16. A laser, as recited by claim 15, wherein said heat exchange means comprises a plurality of metal plates arranged to provide a large surface area appointed for contact with said preselected gas to promote exchange of heat from said gas to said housing.

17. A laser, as recited by claim 5, wherein said heating means comprises a resistance wire spirally wrapped around substantially the entire length of said rod.

* * * * *